US012752805B2

(12) United States Patent
Xu et al.

(10) Patent No.: US 12,752,805 B2
(45) Date of Patent: Oct. 6, 2026

(54) MOBILE BODY CONTROL DEVICE, MOBILE BODY, AND NON-TRANSITORY COMPUTER READABLE MEDIUM FOR CONTROLLING OUTPUT OF APPLICATION INSTRUCTIONS BASED ON RISK LEVEL

(71) Applicant: DENSO CORPORATION, Kariya-city (JP)

(72) Inventors: Xin Xu, Kariya-city (JP); Zhifan Liu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 64 days.

(21) Appl. No.: 18/894,164

(22) Filed: Sep. 24, 2024

(65) Prior Publication Data

US 2025/0010868 A1 Jan. 9, 2025

Related U.S. Application Data

(63) Continuation of application No. PCT/JP2023/004301, filed on Feb. 9, 2023.

(30) Foreign Application Priority Data

Mar. 30, 2022 (JP) ................................ 2022-055483

(51) Int. Cl.
*B60W 50/04* (2006.01)
*B60W 50/12* (2012.01)

(52) U.S. Cl.
CPC .......... *B60W 50/045* (2013.01); *B60W 50/12* (2013.01)

(58) Field of Classification Search
CPC ............................ B60W 50/045; B60W 50/12
See application file for complete search history.

(56) References Cited

U.S. PATENT DOCUMENTS

2005/0038573 A1* 2/2005 Goudy ................ B60R 16/0231 701/1
2008/0103640 A1 5/2008 Watanabe et al.
2010/0250052 A1 9/2010 Ogino
2018/0143628 A1* 5/2018 Samper ........... B60W 30/18027
2021/0084464 A1 3/2021 Watanabe et al.
2023/0227023 A1* 7/2023 Cho ...................... B60W 30/06 701/2

(Continued)

FOREIGN PATENT DOCUMENTS

JP 2006031203 A 2/2006
JP 2006231964 A 9/2006

(Continued)

*Primary Examiner* — Navid Z. Mehdizadeh
*Assistant Examiner* — Matthew Ho
(74) *Attorney, Agent, or Firm* — Harness, Dickey & Pierce, P.L.C.

(57) ABSTRACT

Disclosed is a technique of controlling a mobile body. In the technique, a current operating state of the mobile body is analyzed, and it is determined whether a control instruction from an application is safe for the current operating state. The control instruction is allowed to be output to a control target based on the control instruction being determined to be safe in the current operating state. The control instruction is prevented from being output to the control target based on the control instruction being determined to be unsafe in the current operating state.

6 Claims, 6 Drawing Sheets

(56) References Cited

U.S. PATENT DOCUMENTS

| | | | |
|---|---|---|---|
| 2023/0376575 | A1 | 11/2023 | Anzai et al. |

FOREIGN PATENT DOCUMENTS

| | | | |
|---|---|---|---|
| JP | 2010231415 | A | 10/2010 |
| JP | 2021030882 | A | 3/2021 |
| JP | 2021048495 | A | 3/2021 |
| JP | 2021049926 | A | 4/2021 |
| WO | WO-2022172578 | A1 | 8/2022 |

* cited by examiner

FIG. 4

| CONTROL TARGET | CONTROL STATE | | OPERATING ENVIRONMENT | | | | | |
|---|---|---|---|---|---|---|---|---|
| | TRAVELING | STOPPED | SUNSHINE | RAIN | STRONG WIND | EXPRESSWAY | SLOPE | VEHICLE SPEED LIMIT |
| AIR CONDITIONER ON | 0 | 0 | 0 | 0 | 0 | 0 | 0 | 0 |
| AIR CONDITIONER OFF | 0 | 0 | 0 | 0 | 0 | 0 | 0 | 0 |
| ENTERTAINMENT ON | 0.1 | 0 | 0.1 | 0.1 | 0.1 | 0.1 | 0.1 | 0.1 |
| WIPER ON | 0 | 0 | 0 | 0 | 0 | 0 | 0 | 0 |
| WIPER OFF | 0 | 0 | 0 | 1 | 0 | 0 | 0 | 0 |
| WINDOW OPEN | 0 | 0 | 0 | 0.8 | 0.9 | 0 | 0 | 0 |
| WINDOW CLOSED | 0 | 0 | 0 | 0 | 0 | 0 | 0 | 0 |
| DOOR OPEN | 1 | 0.5 | 0 | 0.3 | 0.3 | 1 | 0.2 | 1 |
| DOOR CLOSED | 1 | 0.5 | 0 | 0.3 | 0.3 | 1 | 0.2 | 1 |

MOBILE BODY CONTROL DEVICE, MOBILE BODY, AND NON-TRANSITORY COMPUTER READABLE MEDIUM FOR CONTROLLING OUTPUT OF APPLICATION INSTRUCTIONS BASED ON RISK LEVEL

CROSS REFERENCE TO RELATED APPLICATIONS

The present application is a continuation application of International Patent Application No. PCT/JP2023/004301 filed on Feb. 9, 2023, which designated the U.S. and claims the benefit of priority from Japanese Patent Application No. 2022-055483 filed on Mar. 30, 2022. The disclosures of all the above applications are incorporated herein.

TECHNICAL FIELD

The present disclosure relates to a technique of controlling a mobile body.

BACKGROUND

In recent years, there has been a growing trend for vehicles to incorporate systems that allow for the integration of applications developed by external entities, commonly referred to as third parties, distinct from the vehicle manufacturers.

SUMMARY

According to at least one embodiment of the present disclosure, a technique of controlling a mobile body includes analyzing a current operating state of the mobile body; determining whether a control instruction from an application is safe in the current operating state; allowing the control instruction to be output to a control target based on the control instruction being determined to be safe in the current operating state; and preventing the control instruction from being output to the control target based on the control instruction being determined to be unsafe in the current operating state.

BRIEF DESCRIPTION OF THE DRAWINGS

The details of one or more embodiments are set forth in the accompanying drawings and the description below. Other features and advantages will be apparent from the description and drawings, and from the claims.

FIG. 4 is a diagram illustrating a risk level matrix according to the embodiment.

DETAILED DESCRIPTION

Figure 1:
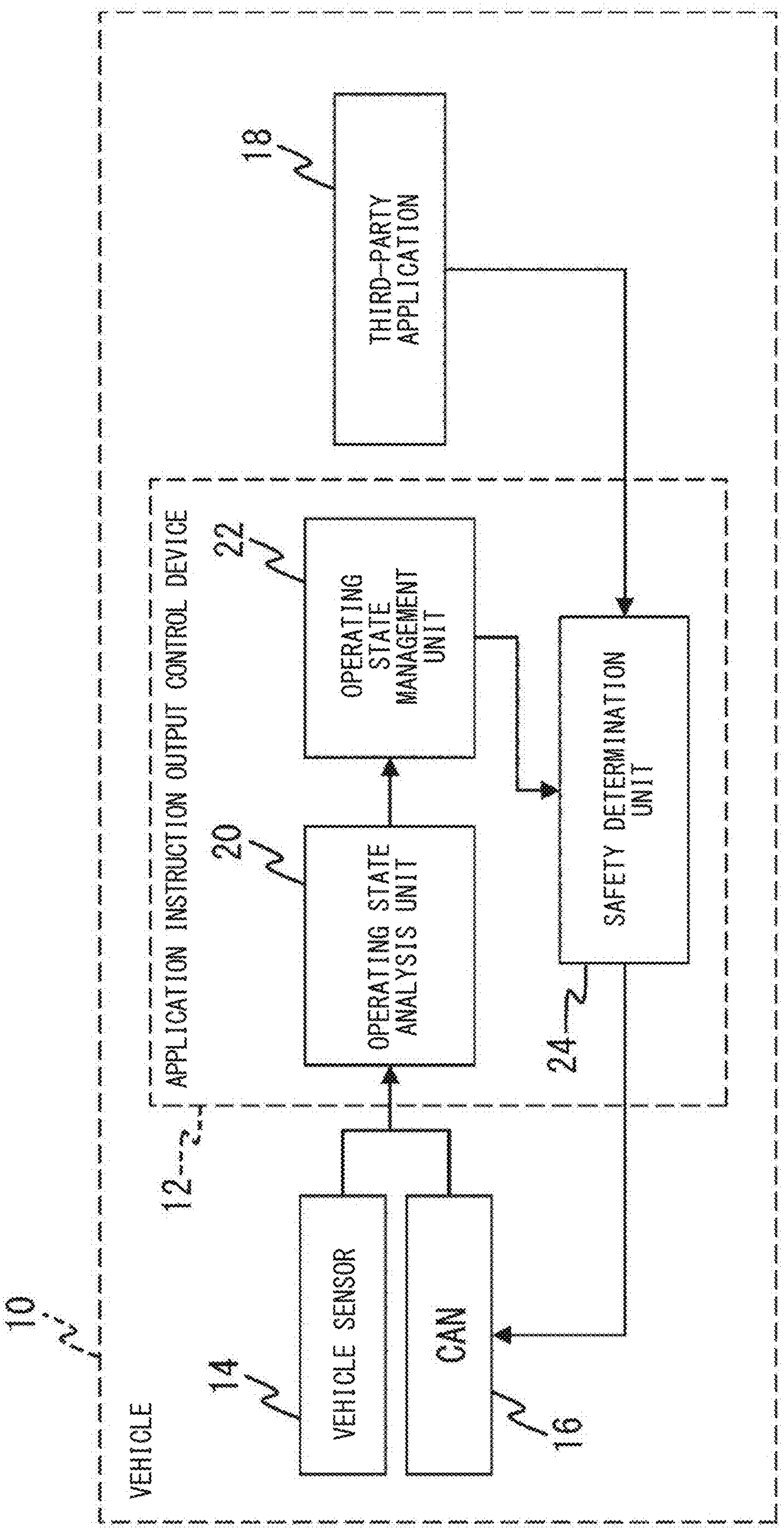
FIG. 1 is a functional block diagram of an application instruction output control device according to an embodiment.

To begin with, examples of relevant techniques will be described. In recent years, an increasing number of vehicles include vehicle systems to which applications manufactured by parties different from the vehicle manufactures, so-called third parties, can be connected. Such third-party applications are, for example, CarPlay (registered trademark) by Apple Inc. or Android Automotive by Google LLC.

The applications provide various services such as entertainment and failure diagnosis using vehicle data. In those services, for example, the application may control the vehicle, as in a service where the user's vehicle is registered as a delivery destination of a package, so that a delivery person opens the trunk of the vehicle and puts the package therein (in-car delivery). In addition to opening and closing the trunk, the objects to be controlled by the application include, for example, opening and closing windows and doors, and turning lights and hazards on and off. Even when a vehicle control instruction is output from such a third-party manufactured application, the safety of the vehicle needs to be ensured.

Here, a first comparative example is a vehicle control device that notifies a processing server of a rule defining whether a communication frame received by a vehicle-side communication unit is illegal when an installation request for an application program is received from the processing server.

A second comparative example is an acceleration suppression device that suppresses acceleration by controlling an output signal indicating an accelerator opening degree and a brake depression force when a driver is suspected of being in a poor mental and physical condition lasting longer than a time determination value and it is determined that the traveling state is a dangerous traveling state.

A third comparative example is a control device that compares a depression amount according to a vehicle accelerator signal with a predetermined threshold when a vehicle starts, and compares a depression force of an accelerator pedal with the predetermined threshold while the vehicle is traveling, to determine whether the accelerator pedal is being depressed incorrectly. The control device then performs control, such as suppressing the acceleration of the vehicle, when the accelerator pedal is being depressed incorrectly.

The vehicle control device of the first comparative example is a countermeasure against illegal control by a cyberattack on the vehicle. On the other hand, a control instruction from an application manufactured by a third party is a legitimate control instruction and is not an illegal control instruction. Thus, the vehicle control device of the first comparative example cannot deal with the control instruction.

The second and third comparative examples are intended to prevent sudden acceleration of a vehicle due to erroneous stepping of an accelerator pedal and a brake pedal, and to ensure the safety of the vehicle, but are not intended to determine the safety of a vehicle control instruction from a third-party manufactured application.

As noted above, a vehicle control instruction from the third-party manufactured application may be output to the vehicle regardless of the operating state of the vehicle. In addition, the comparative examples described above cannot determine the safety of the vehicle control instruction from the application.

In contrast, the present disclosure provides a mobile body control device, a mobile body, and a control program capable of ensuring the safety of a mobile body even when the mobile body is controllable by an application.

According to an aspect of the present disclosure, a mobile body control device includes an analysis unit and a determination unit. The analysis unit is configured to analyze a current operating state of a mobile body. The determination unit is configured to determine whether a control instruction from an application is safe in the current operating state, allow the control instruction to be output to a control target based on the control instruction being determined to be safe in the current operating state, and prevent the control instruction from being output to the control target based on the control instruction being determined to be unsafe in the current operating state.

With this configuration, when it is determined that the control instruction from the application is not safe for the current operating state of the mobile body, control of the mobile body based on the control instruction is not performed. Therefore, this configuration can ensure safety even when the mobile body is controllable by an application manufactured by a third party.

A mobile body according to an aspect of the present disclosure may include the mobile body control device described above.

According to an aspect of the present disclosure, a non-transitory computer readable medium stores a control program comprising instructions configured to, when executed by at least one processor, cause a computer included in a mobile body to carry out analyzing a current operating state of the mobile body; determining whether a control instruction from an application is safe in the current operating state; allowing the control instruction to be output to a control target based on the control instruction being determined to be safe in the current operating state; and preventing the control instruction from being output to the control target based on the control instruction being determined to be unsafe in the current operating state.

According to the present disclosure, it is possible to ensure the safety of the mobile body even when the mobile body is made controllable by the application.

Hereinafter, an embodiment of the present disclosure will be described referring to drawings. The embodiment described below is an example of implementation of the present disclosure, and does not limit the present disclosure to specific configurations described below. For the implementation of the present disclosure, configurations may be selectively employed from among the specific configurations depending on an embodiment.

In the present embodiment, an example of the mobile body will be described as a vehicle, but the present invention is not limited thereto. The mobile body may be, for example, a motorcycle, a heavy machine operated at a work site, an aircraft, or the like.

FIG. 1 is a functional block diagram of an application instruction output control device 12 that is one of control devices provided in a vehicle 10 according to the present embodiment.

The application instruction output control device 12 is one of electronic control units (ECUs) installed in the vehicle 10. The application instruction output control device 12 transmits and receives various data to and from a vehicle sensor 14, a controller area network (CAN) 16, and a third-party application (hereinafter referred to as a "third-party application") 18.

The vehicle sensor 14 includes a plurality of types of sensors installed in the vehicle 10. The vehicle sensor 14 includes a vehicle speed sensor and an inertial sensor that detect the traveling state of the vehicle 10, an in-vehicle camera that detects a state and an operating operation of a driver, a pedal sensor, and a steering sensor. In addition, the vehicle sensor 14 includes an exterior camera, a millimeter wave radar, and a rider used for driving assistance or automated driving.

The CAN 16 communicates with another ECU or the like installed in the vehicle 10 and the application instruction output control device 12.

As an example, the third-party application 18 of the present embodiment is application software manufactured by a third party different from the manufacturer of the vehicle 10. The third-party application 18 outputs an application instruction, which is a control instruction for the vehicle 10, to the application instruction output control device 12. In the following description, a control instruction from the third-party application 18 is referred to as an application instruction.

Examples of the application instruction include on/off of an air conditioner, adjustment of a seat position, on/off of a wiper, opening/closing of a door, opening/closing of a window, opening/closing of a trunk, on/off of an entertainment function, on/off of an agent interaction function, on/off of a light, on/off of a hazard lamp, and the like.

For example, the application instruction may be output by a user operating the third-party application 18 installed in the vehicle 10 via a touch panel display or the like provided in the vehicle 10, or may be output from the third-party application 18 by communicating with the vehicle 10 via a portable terminal device such as a smartphone owned by the user.

The third-party application 18 according to the present embodiment may have a function of operating independently regardless of the control of the vehicle 10. This function is, for example, a reproduction function of music, a moving image, or the like, a navigation function, or the like. These functions are executed by the user operating the third-party application 18.

The application instruction output control device 12 has a function of determining the safety of the application instruction output by the third-party application 18. The application instruction output control device 12 according to the present embodiment includes an operating state analysis unit 20, an operating state management unit 22, and a safety determination unit 24.

The operating state analysis unit 20 analyzes a current operating state of the vehicle 10. The operating state of the vehicle 10 analyzed by the operating state analysis unit 20 is a scene of a predetermined series of operating behaviors, and indicates a control state of the vehicle 10.

Examples of the control state of the vehicle 10 include an operating manner and a traveling state. The operating manner is, for example, turning left, turning right, accelerating, changing course, backing up, going straight, or the like. The traveling state is, for example, normal traveling that is traveling at a speed of 20 km/h or more and less than 80 km, high-speed traveling that is traveling at a speed of 80 km/h or more, slow traveling that is traveling at a speed of less than 20 km/h, idling, or stopping. The control state of the vehicle 10 is determined based on the output value of the vehicle sensor 14, the output value of the ECU acquired via the CAN 16, and the like. In the following description, the output value of the vehicle sensor 14 and the output value of the ECU are collectively referred to as vehicle data.

The current operating state of the vehicle 10 also includes the operating environment of the vehicle 10. Examples of the operating environment of the vehicle 10 include weather and a place. The weather is, for example, sunny, rainy, snowy, strong, or the like. The place is an expressway, a slope, a vehicle speed limit, or the like. The operating environment of the vehicle 10 is determined based on data output from the vehicle sensor 14, an external server that communicates with the vehicle 10, or the like.

The operating state management unit 22 registers the classification contents of the operating state for analyzing the current operating state of the vehicle 10 described above, a risk level score to be described later, and the like. The registration here includes the storage, update, and the like of setup contents and set values.

The safety determination unit 24 determines whether the control instruction from the third-party application 18 is safe in the current operating state of the vehicle 10. The application instruction output control device 12 allows the application instruction to be output to the control target when the safety determination unit 24 determines that the control instruction is safe, and prevents the application instruction from being output to the control target when the safety determination unit 24 determines that the control instruction is not safe.

The application instruction is output to the control target directly or to a responsible ECU for controlling the control target via the CAN 16. The output application instruction is subjected to command conversion as appropriate.

Figure 2:
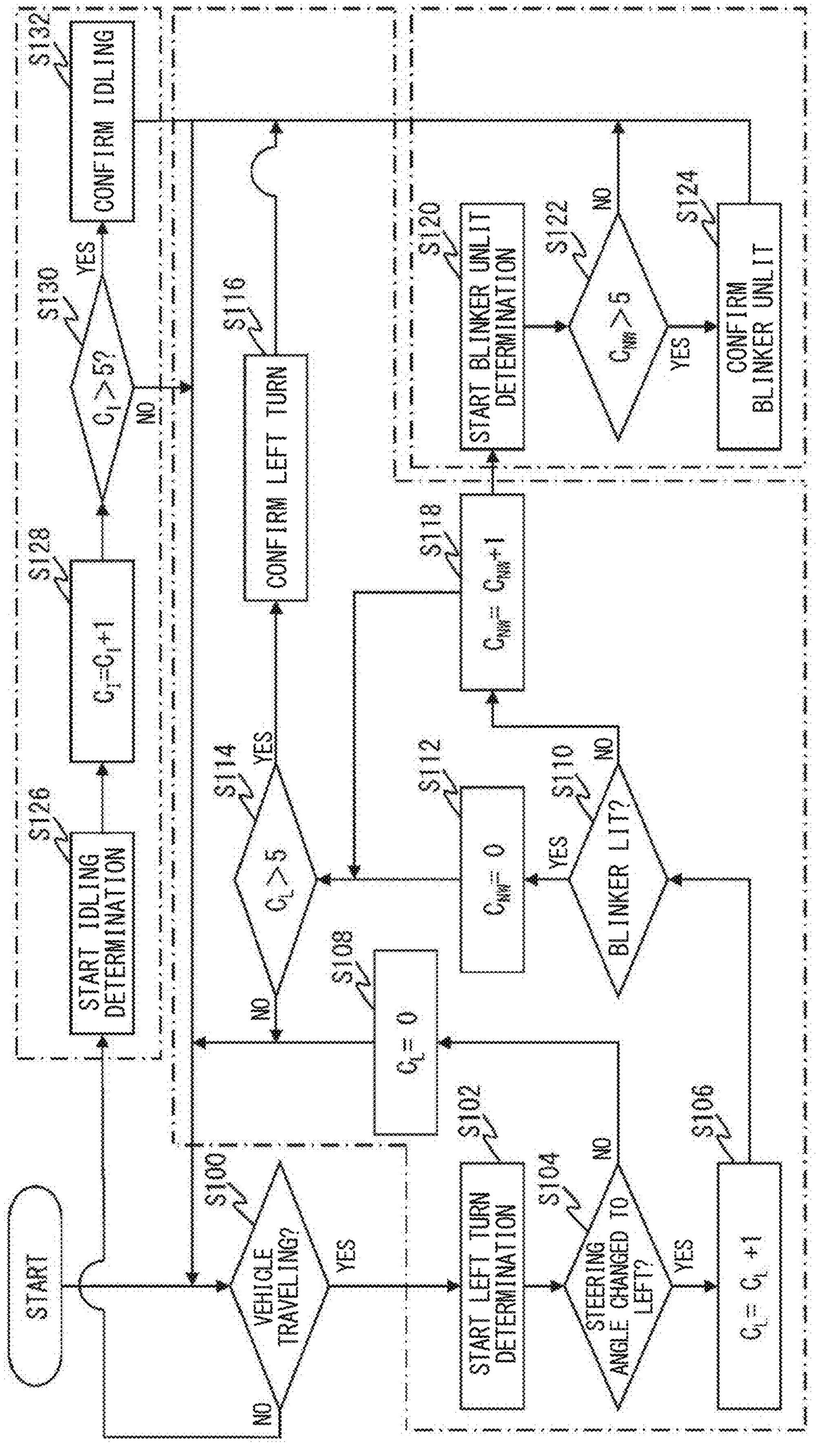
FIG. 2 is a flowchart illustrating a flow of an operating state analysis process according to the embodiment.

FIG. 2 is a flowchart illustrating a flow of an operating state analysis process executed by the operating state management unit 22 according to the present embodiment. The operating state analysis process is repeatedly executed, for example, in a state where the start button of the vehicle 10 is turned on. The operating state analysis process is executed by a program stored in a storage medium. By the execution of the program, a method corresponding to the program is performed.

As an example, FIG. 2 determines whether the control state of the vehicle 10 is turning left, idling, or no blinker being lit. Other control states of the vehicle 10 are determined by a process similar to the process illustrated in FIG. 2.

First, in step 100, it is determined whether the vehicle 10 is traveling, and when the determination is positive, the process proceeds to step 102 to start a left turn determination. On the other hand, when the determination is negative, the process proceeds to step 126 to start an idling determination.

In step 104 proceeded from step 102, it is determined whether a steering angle has changed to the left. When the determination is positive, the process proceeds to step 106, and when the determination is negative, the process proceeds to step 108.

In step 106, a left turn counter CL indicating that the steering angle is left is incremented by one, and the process proceeds to step 110.

In step 108, by setting the left turn counter CL to 0, the left turn counter CL is reset, and the process proceeds to step 100.

In step 110, it is determined whether the blinker is lit. When the determination is positive, the process proceeds to step 112, and when the determination is negative, the process proceeds to step 118.

In step 112, a blinker unlit counter CNW, indicating that the blinker is not lit, is reset by being set to 0, and the process proceeds to step 114.

In step 114, it is determined whether the left turn counter CL is 5 or more. When the determination is positive, the process proceeds to step 116, and when the determination is negative, the process proceeds to step 100.

In step 116, it is determined that the control state of the vehicle 10 is the left-turn state, and the process proceeds to step 100.

In step 118 to which the process proceeds when the determination is negative in step 110, the blinker unlit counter CNW is incremented by one, and the process proceeds to step 114 and step 120.

In step 120, the blinker unlit determination is started. In the next step 122, it is determined whether the blinker unlit counter CNW is 5 or more. When the determination is positive, the process proceeds to step 124, and when the determination is negative, the process proceeds to step 100.

In step 124, it is determined that the control state of the vehicle 10 is the blinker unlit state, and the process proceeds to step 100.

In step 126 to which the process proceeds when the determination is negative in step 100, the idling determination is started. In the next step 128, the idling counter CI indicating the idling state is incremented by one, and the process proceeds to step 130.

In step 130, it is determined whether the idling counter CI is 5 or more. When the determination is positive, the process proceeds to step 132, and when the determination is negative, the process proceeds to step 100.

In step 132, it is determined that the control state of the vehicle 10 is the idling state, and the process proceeds to step 100.

As described above, the operating state analysis process of the present embodiment analyzes the current operating state, based on the operating states classified in advance. That is, in the example of FIG. 2, the operating states are classified in advance as follows: steps 102 to 118 are left turn determination, steps 120 to 124 are blink-on determination, and steps 126 to 132 are idling determination. It is determined which of the operating states classified in this manner the current operating state corresponds to. As a result, the operating state analysis process can simply and accurately determine the current operating state.

Further, the operating state analysis process of the present embodiment analyzes which operating state the operating state of the vehicle 10 is in depending on whether the same control is continuously performed. Specifically, it is determined whether the same control is continuously performed by incrementing or resetting a counter serving as a determination reference of the operating state, such as the left turn counter CL, the blinker unlit counter CNW, and the idling counter CI. As a result, the operating state analysis process can simply analyze the operating state of the vehicle 10 in real time.

Each determination by the operating state analysis process is performed at predetermined time intervals such as one-second intervals, for example. As a result, it is possible to determine whether the same control is continuously performed by incrementing or resetting the counter at one-second intervals. A shorter determination interval may be required to determine the operating state related to the operating control. Therefore, the determination interval is determined based on the output frequency of the observation target.

The threshold for determining which operating state the current operating state corresponds to is set to 5 by each counter. However, this is an example, and other values may be used, and the threshold may be different according to each operating state. The process of FIG. 2 is an example, and a process to reset the counter and other processes may be included appropriately.

The classified operating state, the threshold, and the like are stored in the operating state management unit 22. The application instruction output control device 12 of the present embodiment may perform other processes different from the operating state analysis process described with reference to FIG. 2 as long as the control state of the vehicle 10 can be determined.

Figure 3:
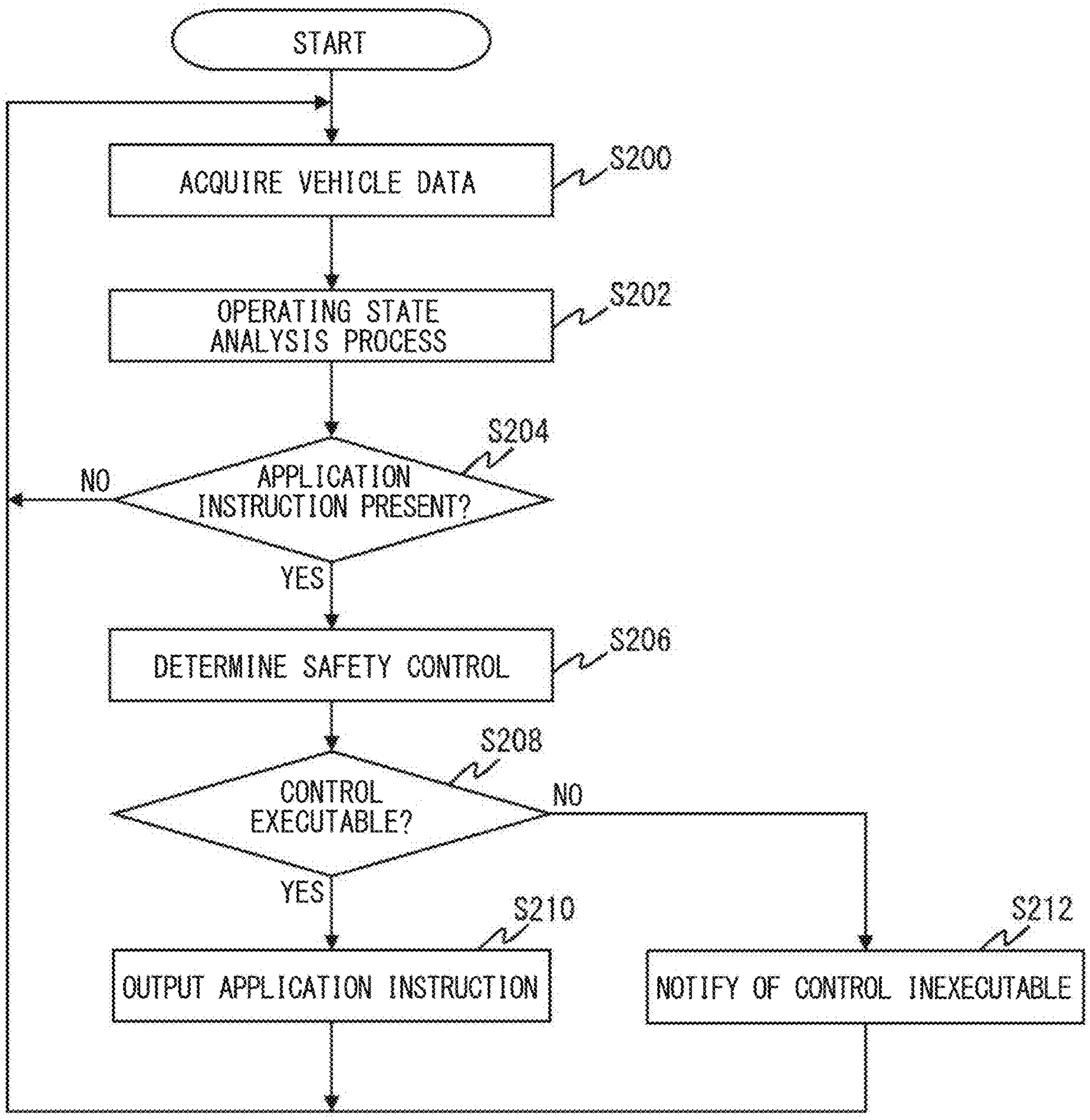
FIG. 3 is a flowchart illustrating a flow of a control possibility determination process according to the embodiment.

FIG. 3 is a flowchart illustrating a flow of a control possibility determination process executed by the application instruction output control device 12 of the present embodiment. The control possibility determination process is repeatedly executed while the start button of the vehicle 10 is on. The control possibility determination process is executed by a program stored in the storage medium. By the execution of the program, a method corresponding to the program is performed.

First, in step 200, the operating state analysis unit 20 acquires vehicle data from the vehicle sensor 14 and the CAN 16.

In the next step 202, the operating state analysis unit 20 performs the operating state analysis process of the vehicle 10.

In the next step 204, the safety determination unit 24 determines whether an application instruction has been output from the third-party application 18. When the determination is positive, the process proceeds to step 206, and when the determination is negative, the process returns to step 200, repeating the acquisition of vehicle data and the determination of an operating state.

In step 206, the safety determination unit 24 performs a safety determination to determine whether the application instruction output from the third-party application 18 is safe for the current operating state of the vehicle 10.

In the next step 208, it is determined whether control by the application instruction can be executed based on the result of the safety determination. When the determination is positive, the process proceeds to step 210, and when the determination is negative, the process proceeds to step 212.

In step 210, the safety determination unit 24 outputs the application instruction to the control target via the CAN 16, and the process proceeds to step 200. As a result, the vehicle 10 performs control based on the application instruction.

In step 212, the safety determination unit 24 notifies the user via the third-party application 18 that control cannot be executed based on the application instruction, and the process returns to step 200.

Here, the safety determination, which is the process of step 206, will be described. The safety determination unit 24 of the present embodiment determines safety using a risk level that is calculated based on the control target to which the application instruction is output and the current operating state of the vehicle 10.

The risk level of the present embodiment is calculated based on a set value (hereinafter referred to as "risk level score") set for each control target according to the operating state of the vehicle 10. FIG. 4 is a risk level matrix indicating the risk level score. As illustrated in FIG. 4, the risk level score is set for each control state and each operating environment that are the operating states of the vehicle 10 with respect to the control target, and as an example, the risk level score is set in increments of 0.1 between 0 to 1. The risk level score illustrated in FIG. 4 is an example, and is also set according to another control target and another operating state.

When the sum of the risk level scores each corresponding to the control target to which the application instruction is output and the current operating state of the vehicle 10 is a predetermined value or more, the safety determination unit 24 determines that the application instruction is not safe. The predetermined value is, for example, 1.

In the example of FIG. 4, when an application instruction indicating to turn the air conditioner on is output from the third-party application 18 while the vehicle 10 is traveling, the sum of the risk level scores is 0 and is less than 1, and thus the safety determination unit 24 determines that the application instruction is safe.

On the other hand, when the vehicle 10 is stopped and an application instruction to close the opening of the door in operating environments of rain and a slope is output from the third-party application 18, the sum of the risk level scores is 1 (0.5+0.3+0.2) and is 1 or more, so that the safety determination unit 24 determines that the application instruction is not safe.

In addition, 1 is set as the risk level score for a high-risk combination of a control target and an operating state, such as the opening and closing of the door during traveling.

Figure 5:
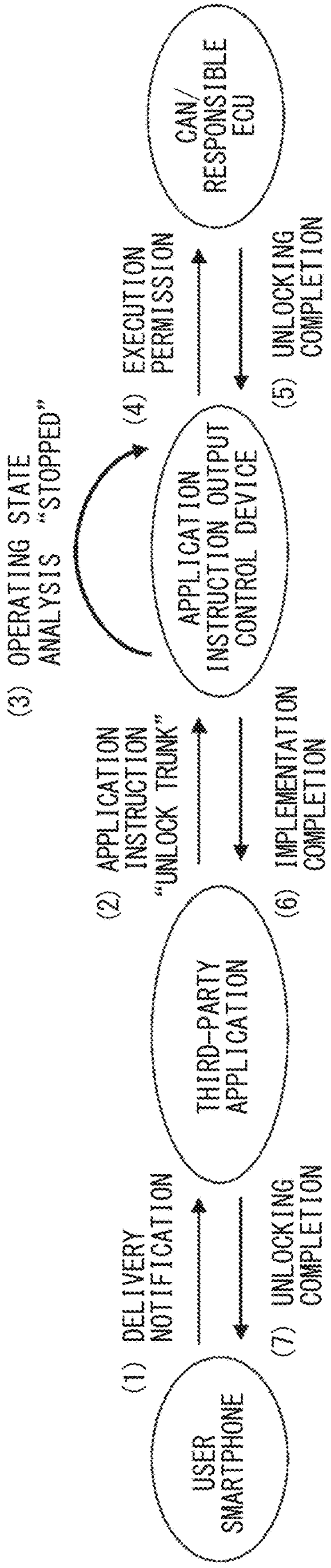
FIG. 5 is a schematic diagram illustrating a specific example of control by a third-party application according to the embodiment.
Figure 6:
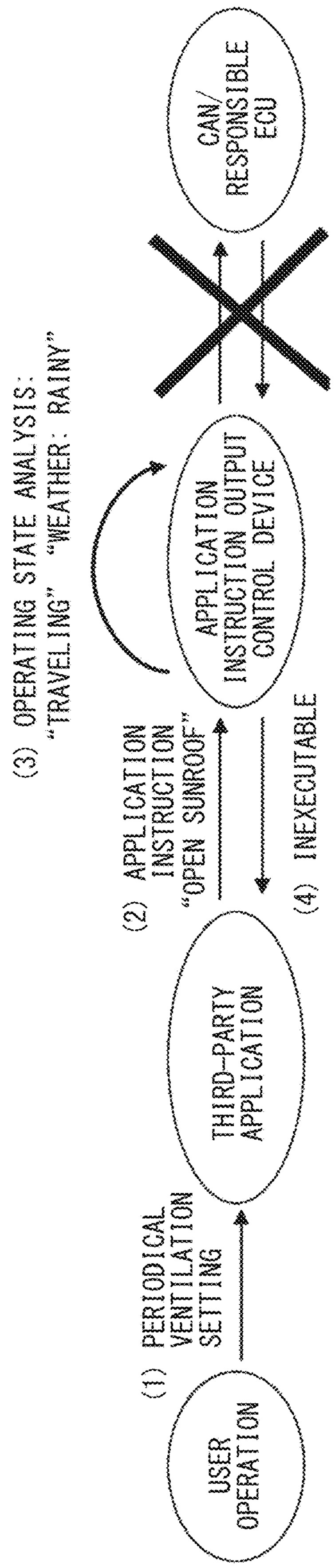
FIG. 6 is a schematic diagram illustrating a specific example of the control by the third-party application according to the embodiment.

FIGS. 5 and 6 are schematic diagrams illustrating specific examples of the control by the third-party application 18 according to the present embodiment.

FIG. 5 illustrates a flow in a case where the trunk is unlocked to have a delivery to the user delivered to the trunk of the vehicle 10.

First, when the user's smartphone receives a delivery notification from a delivery company, the third-party application 18 outputs a trunk unlock as an application instruction. As a result of the operating state analysis, the application instruction output control device 12 determines that the trunk unlocking control can be implemented because the vehicle 10 is stopped, and outputs the application instruction to the responsible ECU via the CAN 16. When the responsible ECU completes unlocking the trunk, the application instruction output control device 12 outputs information indicating the completion of execution to the third-party application 18. The third-party application 18 notifies the user's smartphone that the trunk has been unlocked.

FIG. 6 illustrates a flow in a case where the user sets the opening of a sunroof for periodic ventilation.

First, the user sets to open the sunroof at a predetermined timing for periodic ventilation. The third-party application 18 outputs an application instruction to open the sunroof at the set timing. As a result of performing the operating state analysis, the application instruction output control device 12 determines that the sunroof opening control cannot be implemented because the vehicle 10 is traveling and it is rainy, and notifies the third-party application 18 that the sunroof opening control cannot be implemented. In response to this, the third-party application 18 notifies the user that the sunroof cannot be opened.

As described above, when the application instruction output control device 12 of the present embodiment determines that the application instruction, which is the control instruction from the third-party application 18, is unsafe for the current operating state of the vehicle 10, the application instruction output control device 12 does not control the vehicle 10 based on the application instruction. Therefore, the application instruction output control device 12 of the present embodiment can ensure safety even when the vehicle 10 is made controllable by the third-party application 18.

Although the present disclosure has been described with reference to the above embodiment, the technical scope of the present disclosure is not limited to the scope described in the above embodiment. Various modifications or improvements can be made to the above embodiment without departing from the gist of the disclosure, and the modified or improved embodiments are also included in the technical scope of the present disclosure.

The application installed in the mobile body such as the vehicle 10 according to the above embodiment has been described as an application manufactured by a third party. However, the present invention is not limited thereto, and the application may be manufactured by the manufacturer of the mobile body such as the vehicle 10.

Each function provided by the application instruction output control device 12 of the above embodiment can be provided by software and hardware for executing the software, only software, only hardware, or a combination thereof. When such a function is provided by an electronic circuit as hardware, each function can also be provided by a digital circuit including a large number of logic circuits or an analog circuit.

Each processor such as the ECU of the above embodiment may be configured to include at least one arithmetic core such as a central processing unit (CPU) and a graphics processing unit (GPU). Moreover, the processor may be configured to further include an intellectual property (IP) core or the like with a field-programmable gate array (FPGA) and other dedicated functions.

The form of the storage medium that is adopted as the storage unit of the above embodiment and stores each program related to the data saving method of the present disclosure may be changed appropriately. For example, the storage medium is not limited to the configuration provided on the circuit board, and may be provided in the form of a memory card or the like, inserted into a slot portion, and electrically connected to a computer bus. Moreover, the storage medium may be an optical disk, a hard disk drive, or the like that serves as the basis for copying a program to the computer.

The control device and the method thereof the present embodiment may be implemented by a dedicated computer constituting a processor programmed to execute one or a plurality of functions embodied by a computer program. Alternatively, the device and the method thereof described in the present embodiment may be implemented by a dedicated hardware logic circuit. Alternatively, the device and the method thereof described in the present embodiment may be implemented by one or more dedicated computers configured by a combination of a processor that executes a computer program and one or more hardware logic circuits. The computer program may be stored in a computer-readable non-transitional tangible recording medium as an instruction to be executed by the computer.

The flow of the process described in the above embodiment is also an example, and unnecessary steps may be deleted, new steps may be added, or the process order may be changed without departing from the gist of the present disclosure.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A non-transitory computer readable medium storing a control program comprising instructions configured to, when executed by at least one processor, cause a computer included in a mobile body to carry out:

analyzing a current operating state of the mobile body;

calculating a risk level by summing set values each respectively corresponding to a control target to which a control instruction is output and the current operating state of the mobile body;

determining whether the control instruction from an application is safe in the current operating state, with reference to the calculated risk level;

allowing the control instruction to be output to the control target based on the control instruction being determined to be safe in the current operating state; and preventing the control instruction from being output to the control target based on the control instruction being determined to be unsafe in the current operating state due to the calculated risk level being equal to or greater than a predetermined value.

2. A mobile body control device comprising:

at least one processor; and at least one memory storing instructions configured to, when executed by the at least one processor, cause the at least one processor to carry out:

analyzing a current operating state of a mobile body;

calculating a risk level by summing set values each respectively corresponding to a control target to which a control instruction is output and the current operating state of the mobile body;

determining whether the control instruction from an application is safe in the current operating state, with reference to the calculated risk level;

allowing the control instruction to be output to the control target based on the control instruction being determined to be safe in the current operating state; and preventing the control instruction from being output to the control target based on the control instruction being determined to be unsafe in the current operating state due to the calculated risk level being equal to or greater than a predetermined value.

3. The mobile body control device according to claim 2, wherein the application has been manufactured by a third party.

4. The mobile body control device according to claim 2, wherein the at least one processor is configured to analyze the current operating state based on operating states classified in advance.

5. The mobile body control device according to claim 2, wherein the at least one processor is configured to analyze the current operating state depending on whether same control is continuously performed.

6. The mobile body comprising the mobile body control device according to claim 2.

* * * * *